S. S. Williams,
Windlass Water Elevator.
Nº 38,268. Patented Apr. 21, 1863.
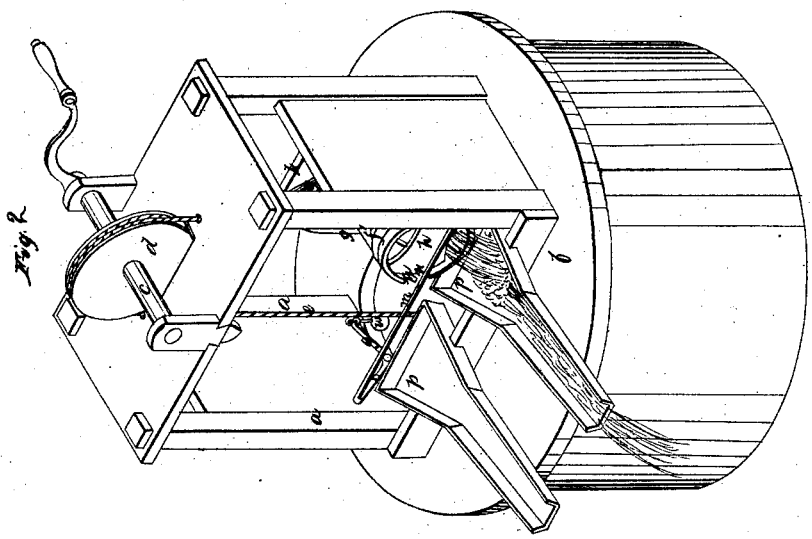
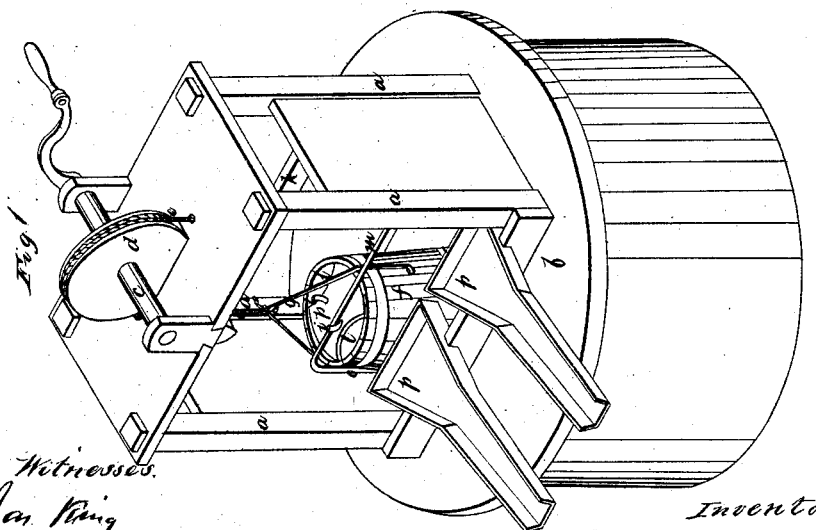
Witnesses.
Jas. King
John C Attersbury
Inventor.
Samuel S. Williams
by his attorney
W. Bakewell

UNITED STATES PATENT OFFICE.

SAMUEL S. WILLIAMS, OF PITTSBURG, PENNSYLVANIA.

IMPROVEMENT IN WATER-ELEVATORS.

Specification forming part of Letters Patent No. 38,268, dated April 21, 1863.

*To all whom it may concern:*

Be it known that I, SAMUEL S. WILLIAMS, of the city of Pittsburg, in the county of Allegheny and State of Pennsylvania, have invented a new and useful Improvement in Apparatus for Drawing Water from Wells; and I do hereby declare the following to be a full, clear, and exact description of my said invention, reference being had to the accompanying drawings, forming part of this specification, in which—

Figure 1 represents my apparatus with one of the buckets raised and on the point of being tilted to discharge the water. Fig. 2 represents the same apparatus with the other bucket raised and tilted, discharging its water.

In each of the figures like letters of reference denote similar parts of my apparatus.

My invention is an improvement on that class of machinery for raising and discharging water from open wells by means of buckets, in which the bucket, when raised, is tilted over automatically, so as to discharge its contents. This effect of tilting the bucket so as to empty the water into a trough is accomplished in various ways, most of which are obnoxious to the objections that the bucket, when tilted, is not projected sufficiently far over the edge of the trough to prevent a portion of its contents, when it begins to tilt, running down into the well, instead of into the trough; and also that the hook or other device on the bucket and the catch or other contrivance which engages the hook are so placed as that the water from the bucket runs over them, so that in winter they become covered with ice, and are thus rendered useless.

My invention is designed to remedy these defects, and also to cause the bucket to present itself to the trough in such a position as to make sure of its being tilted in a proper manner.

My invention further consists in a device to prevent the water splashing over the sides of the bucket when it is being tilted, and to secure the filling of the buckets when lowered into the water at the bottom of the well.

To enable others skilled in the art to construct and use my improvement, I will proceed to describe its construction and operation.

In the drawings, *a* is a suitable frame placed over the opening in the curb *b* of the well, to the top of which frame is attached the windlass *c* and pulley *d*. A rope, *e*, is wound around the pulley *d*, one end of which is attached to one bucket, *f*, and the other end to the other bucket, *f'*, the length of the rope being such that when one bucket is raised high enough to discharge its contents the other bucket is down in the water at the bottom of the well. Each bucket has a bail, *g*, pivoted to each side of it, a little above the middle, and the rope *e* is fastened to the middle of the bail, as shown in the drawings.

Across the frame *a* of the apparatus is placed a horizontal beam, *k*, so high up that the bail of the buckets will not touch it, and over the center of the opening in the curb through which the buckets pass. The rope *e* passes down alongside of the beam *k*, on the side next to that on which the buckets discharge their water. The object of the beam *k* is to prevent the buckets swinging backward and escaping from the trip by which they are tilted. Across the top of each bucket is placed a partial covering or moderator, *h*, which covers over about two-thirds of the top, leaving a space or opening, *l*, on each side of the bail, for the water to pour out of when the bucket is emptied, or enter when it is being filled. To this moderator are attached two hooks, *i i*—one on each side of the bail—so placed that when the bail is raised and the bucket hanging by it the trip *m*, being guided by the bail, may pass between the bail and one of the hooks *i*, and press against the top of the bucket, as seen in Fig. 1; or, instead of the hooks, four notches, *n n*, may be cut in the top of the bucket, (the moderator *h* being set down so as to allow of it,) in such position that the trip, guided by the bail, may enter the notches, as seen in Fig. 2. The trip *m* is an iron rod extending horizontally across the frame of the well, having two arms, *o o*, bent at right angles to the rod, and of sufficient length that when the end of each of the bent arms *o o* is pivoted to the frame *a*, a little below the level of the troughs *p p*, into which the water is to be discharged, the rod shall rest on the top of either of the buckets when it is raised, so that the pivots of the bail shall be level with the troughs, or nearly so. From the extremity of one of the bent arms *o* of the trip *m* projects a short lever, *q*, with a weight, *w*, attached to it, which is sufficient to keep the arms *o o* in an upright position until the bucket begins to tilt, as it is necessary that the trip should rest against the rope *e* or bail *g*, so as to become engaged with the hook *i* or notches *n n* in the bucket *f*.

The operation of the apparatus just described is as follows: As a bucket, *f*, rises to the top of the well, it is kept from swinging backward from the trip *m* by the fact that the rope *e*, to which it is suspended, cannot pass back of the cross-beam *k*. When the top of the bail *g* touches the edge of the horizontal portion of the trip *m*, it presses against the trip sufficiently to turn the bucket, with its bail, parallel to the trip *m*, thus bringing one of the openings *l* in the top of the bucket directly in line with the cloth *p*. As the bucket *f* rises farther, the bail *g* slides up the trip *m* until the trip enters the notches *n n*, as in Fig. 2, or between the hook *i* and the bail *g*, as in Fig. 1, (either device being used, as may be preferred.) The horizontal portion of the trip *m* then rests on the top of the bucket, very near its center, and over the moderator *h*, being thus protected from the water when it is being poured from the bucket, as seen in Fig. 2. When the windlass is turned a little farther, the upper part of the bucket *f* is prevented from rising by the trip *m*; but as the bail is pivoted lower down, the bucket begins to tilt over, and immediately the weight of the bucket being thrown against the trip it yields, allowing the bucket to press forward toward the trough *p*, the bucket turning on the horizontal part of the trip *m*, as a center. This yielding of the trip prevents any sudden tilting of the bucket, and the moderator *h* being over the greater portion of the top of the bucket, the water begins to flow through the lower opening *l*, but does not come out with a splash, as it otherwise would. It will be perceived that the trip does not rise with the bucket at all, but allows the bucket to pass forward as its lower part is elevated, and when the bucket is emptied, and the motion of the windlass reversed, the trip is pressed back again by its counterpoise *w*, thus causing the bucket to assume its proper position over the center of the opening in the curb.

This action of the trip is due to the peculiar arrangement of the parts which I have described, the turning-points of the trip being back of the point at which the water is discharged, and considerably below the level at which the bucket first comes in contact with it, so that in tilting of the bucket the trip yields forward and downward only and does not tilt the bucket at all, until it has caused it to be move forward, so that the mouth of the bucket shall be over the trough *p*.

A further use of the moderator *h* at the top of the buckets, besides the regulation of the discharge of the water, is that it prevents the bucket, when at the bottom of the well and partially filled, from turning bottom upward with its mouth immersed in the water, so that, the air inside being unable to escape, the bucket cannot fill. The moderator obviates this difficulty by checking the bucket, if it has a tendency to turn over on its mouth, and throwing it on its side again, so that it is sure to fill.

What I claim as my invention, and desire to secure by Letters Patent, is—

1. The partial covering to the top of a tilting well-bucket, with an opening on each side of the bail, substantially as described.

2. The yielding trip for tilting the buckets, constructed and arranged substantially as described—that is to say, having its motion below the point at which it first comes in contact with the top of the buckets, and hence descending in the line of an arc of a circle as it is carried over the trough.

3. In combination with the yielding trip, the hooks or other equivalent device to engage the trip, when placed back of the mouth or opening in the bucket for the discharge of the water, so that the water as it is discharged from the bucket shall not run over the hook and trip, substantially as described.

In testimony whereof, I the said SAMUEL S. WILLIAMS have hereunto set my hand.

SAML. S. WILLIAMS.

Witnesses:
W. BAKEWELL,
J. D. HANCOCK.